(12) United States Patent
Nakano

(10) Patent No.: US 10,468,915 B2
(45) Date of Patent: Nov. 5, 2019

(54) POWER RECEIVING UNIT, POWER RECEIVING CONTROL METHOD, WIRELESS POWER TRANSFER SYSTEM, AND ELECTRONIC APPARATUS

(71) Applicant: Sony Corporation, Tokyo (JP)

(72) Inventor: Hiroaki Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 15/104,365

(22) PCT Filed: Jan. 22, 2015

(86) PCT No.: PCT/JP2015/051601
§ 371 (c)(1),
(2) Date: Jun. 14, 2016

(87) PCT Pub. No.: WO2015/115285
PCT Pub. Date: Aug. 6, 2015

(65) Prior Publication Data
US 2017/0005466 A1    Jan. 5, 2017

(30) Foreign Application Priority Data

Jan. 30, 2014 (JP) ................................. 2014-015587

(51) Int. Cl.
*H02J 50/12* (2016.01)
*H02J 50/40* (2016.01)
(Continued)

(52) U.S. Cl.
CPC ............... *H02J 50/12* (2016.02); *G06F 1/28* (2013.01); *H02H 9/045* (2013.01); *H02J 7/0029* (2013.01);
(Continued)

(58) Field of Classification Search
None
See application file for complete search history.

(56) References Cited

U.S. PATENT DOCUMENTS 5,815,355 A     9/1998  Dawes
2003/0197598 A1  10/2003 Hayashi
(Continued)

FOREIGN PATENT DOCUMENTS

JP    2008-206296 A    9/2008
JP    2011-114985 A    6/2011
(Continued)

OTHER PUBLICATIONS

Extended European Search Report dated Sep. 20, 2017 for corresponding European Application No. 15743685.8.
(Continued)

*Primary Examiner* — Thienvu V Tran
*Assistant Examiner* — David M Stables
(74) *Attorney, Agent, or Firm* — Michael Best & Friedrich LLP

(57) ABSTRACT

A power receiving unit of the disclosure includes: a power receiving section that receives power transferred from a power transfer unit in a contactless manner; a protection circuit section that varies a receiving power voltage of the power received by the power receiving section; and a control section that controls an operational state of the protection circuit section to a plurality of statuses on the basis of a plurality of thresholds.

10 Claims, 12 Drawing Sheets

(51) Int. Cl.
*G06F 1/28* (2006.01)
*H02J 7/00* (2006.01)
*H02J 7/02* (2016.01)
*H02H 9/04* (2006.01)
*H02M 7/04* (2006.01)
*H04B 5/00* (2006.01)
*H02J 50/80* (2016.01)

(52) U.S. Cl.
CPC .............. *H02J 7/025* (2013.01); *H02J 50/40* (2016.02); *H02M 7/04* (2013.01); *H04B 5/0037* (2013.01); *H04B 5/0075* (2013.01); *H02J 50/80* (2016.02); *H04B 5/0031* (2013.01)

(56) References Cited

U.S. PATENT DOCUMENTS

2013/0099585 A1* 4/2013 Von Novak ............. H01F 38/14
307/104
2013/0176653 A1 7/2013 Kim et al.

FOREIGN PATENT DOCUMENTS

| JP | 2012-044762 A | 3/2012 |
| JP | 2013-537034 A | 9/2013 |
| WO | 2013-059330 A1 | 4/2013 |
| WO | WO-2013/145403 A1 | 10/2013 |

OTHER PUBLICATIONS

Chinese Office Action dated May 30, 2018 for corresponding Chinese Application No. 201580005618.X.

* cited by examiner

[ FIG. 1 ]
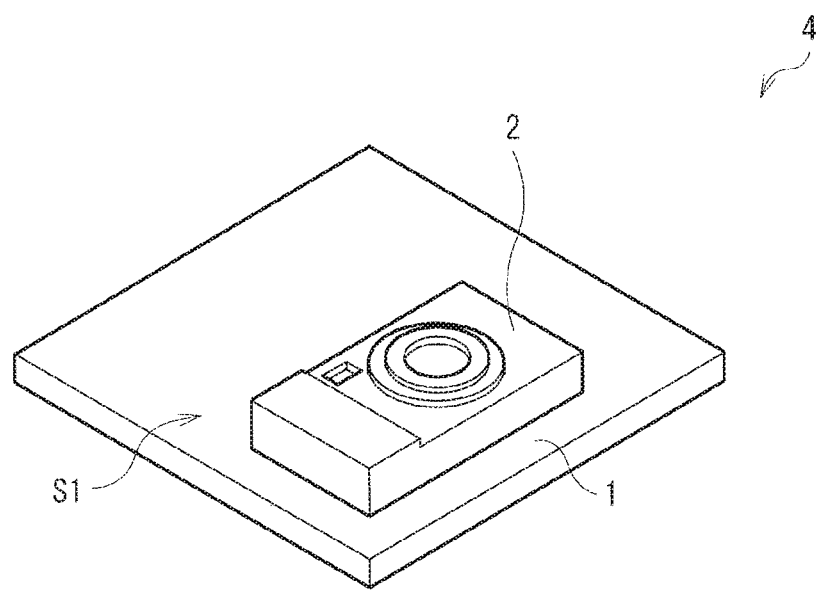

[FIG.2]
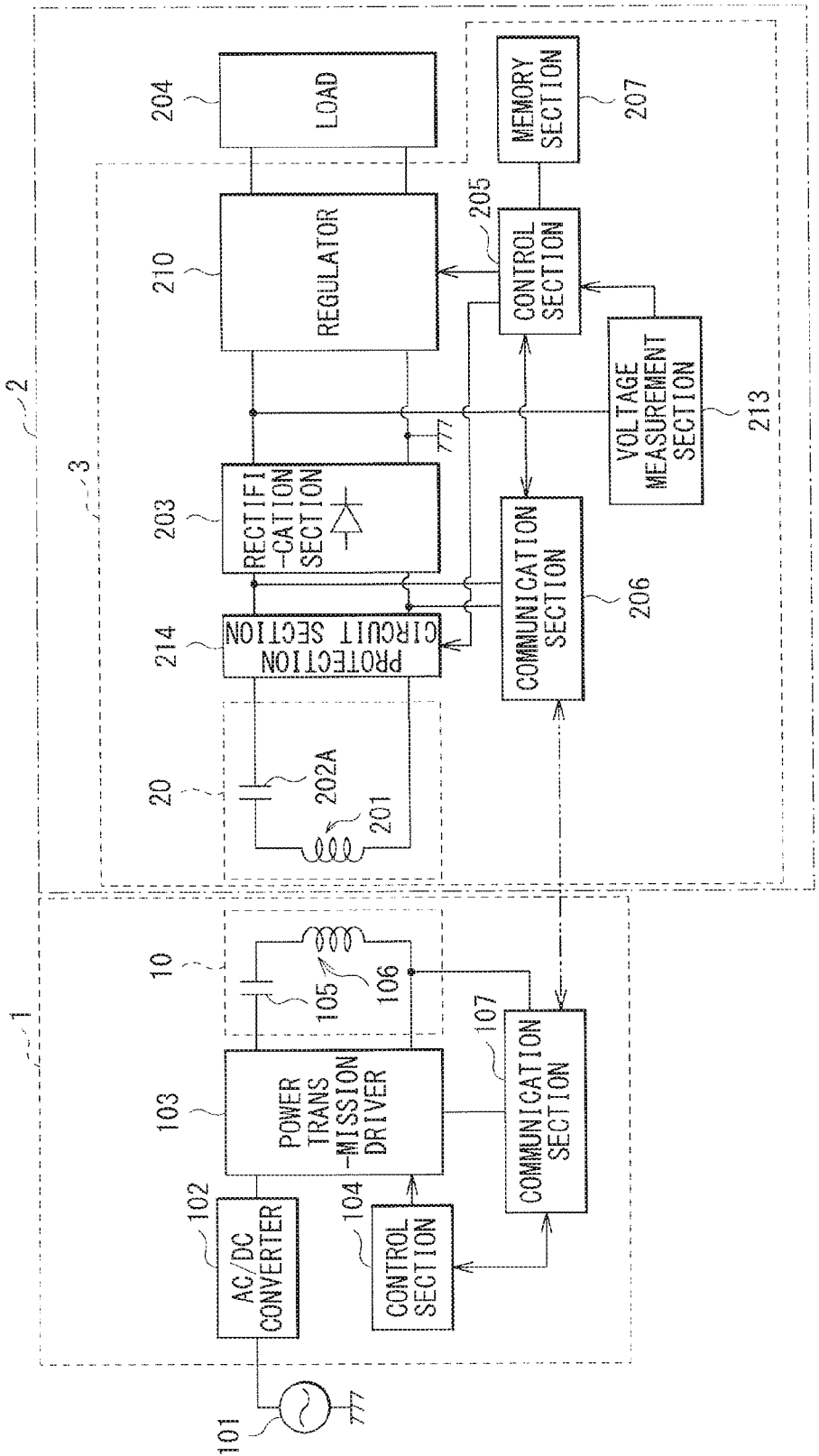

[ FIG. 3 ]
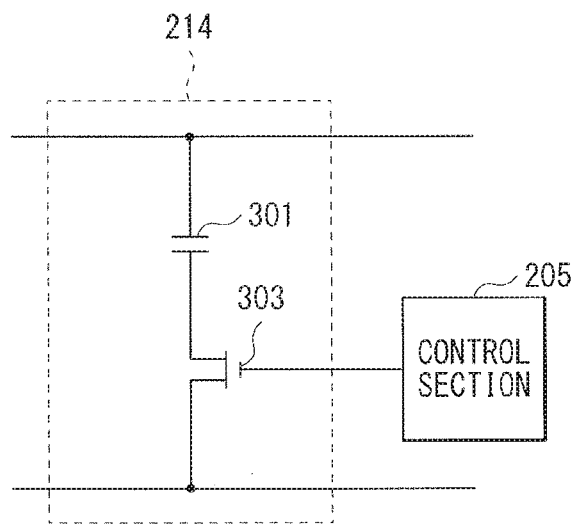
[ FIG. 4 ]
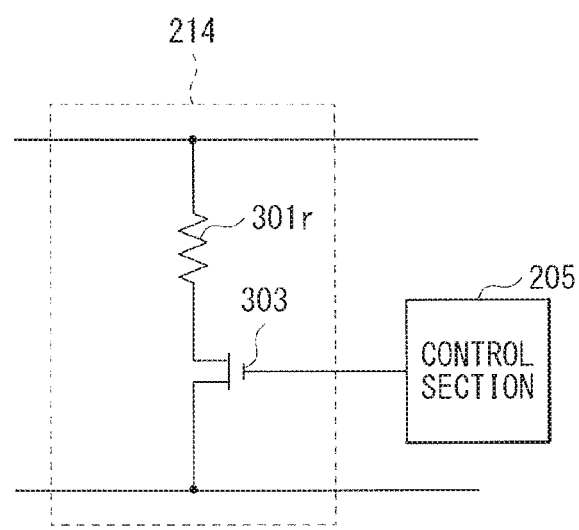

[FIG. 5]
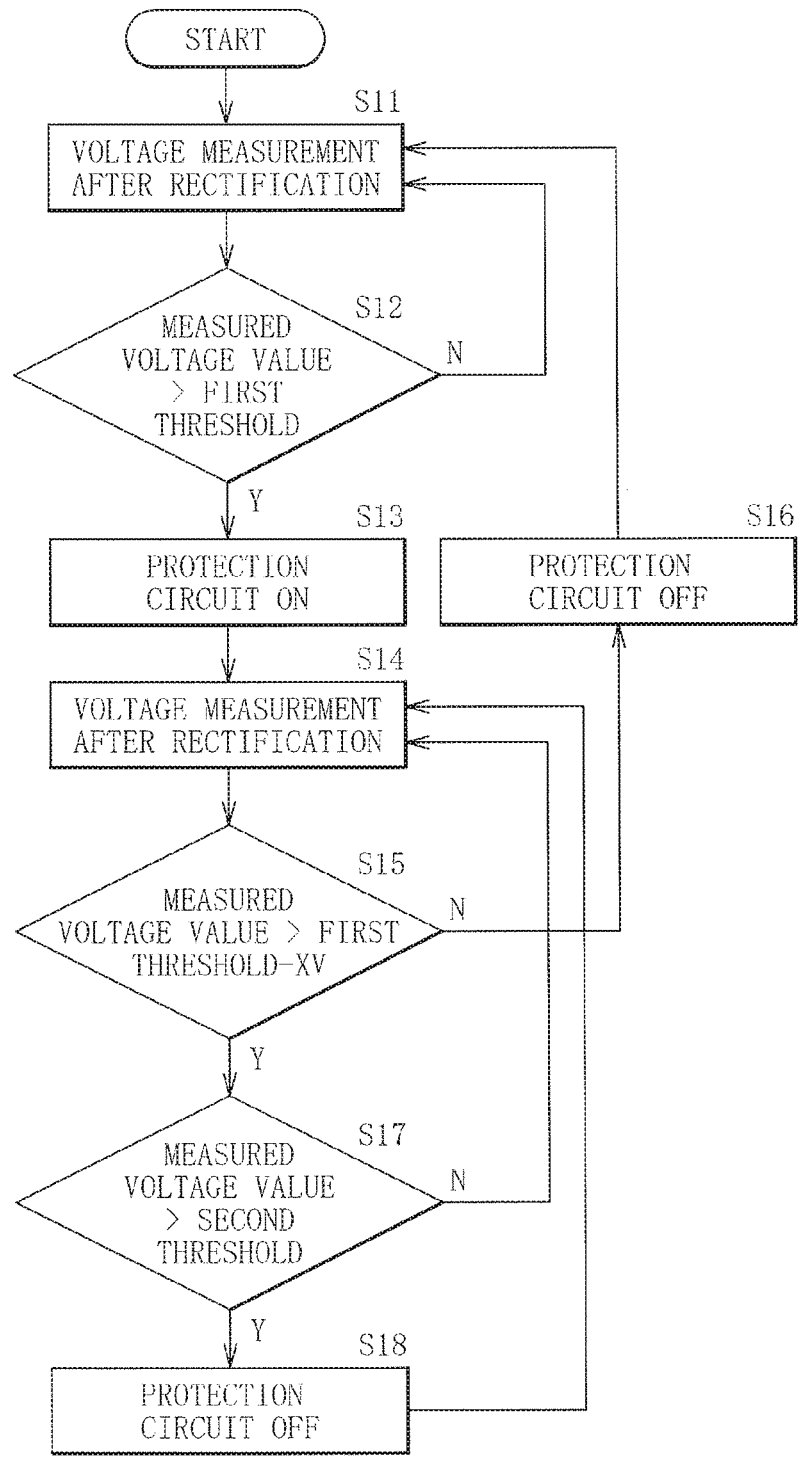

[FIG. 6]
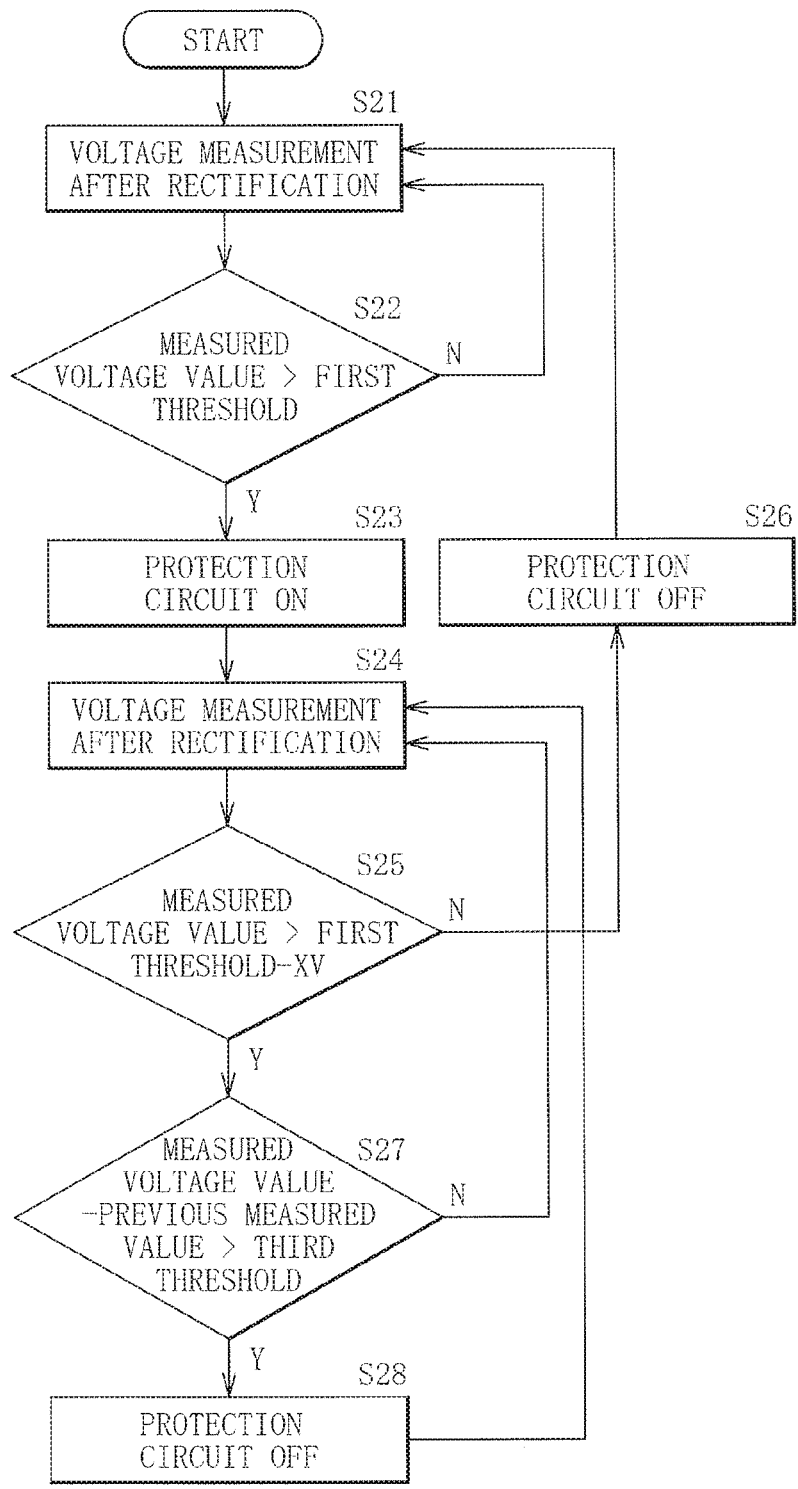

[FIG. 7]
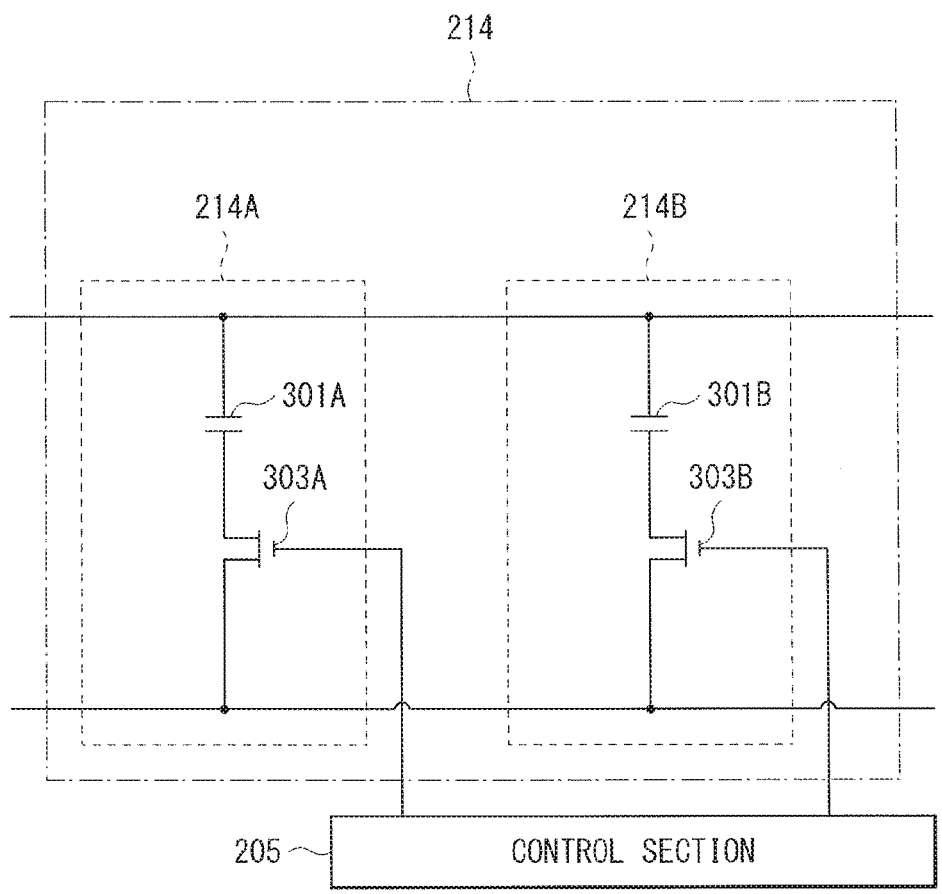

[ FIG. 8 ]
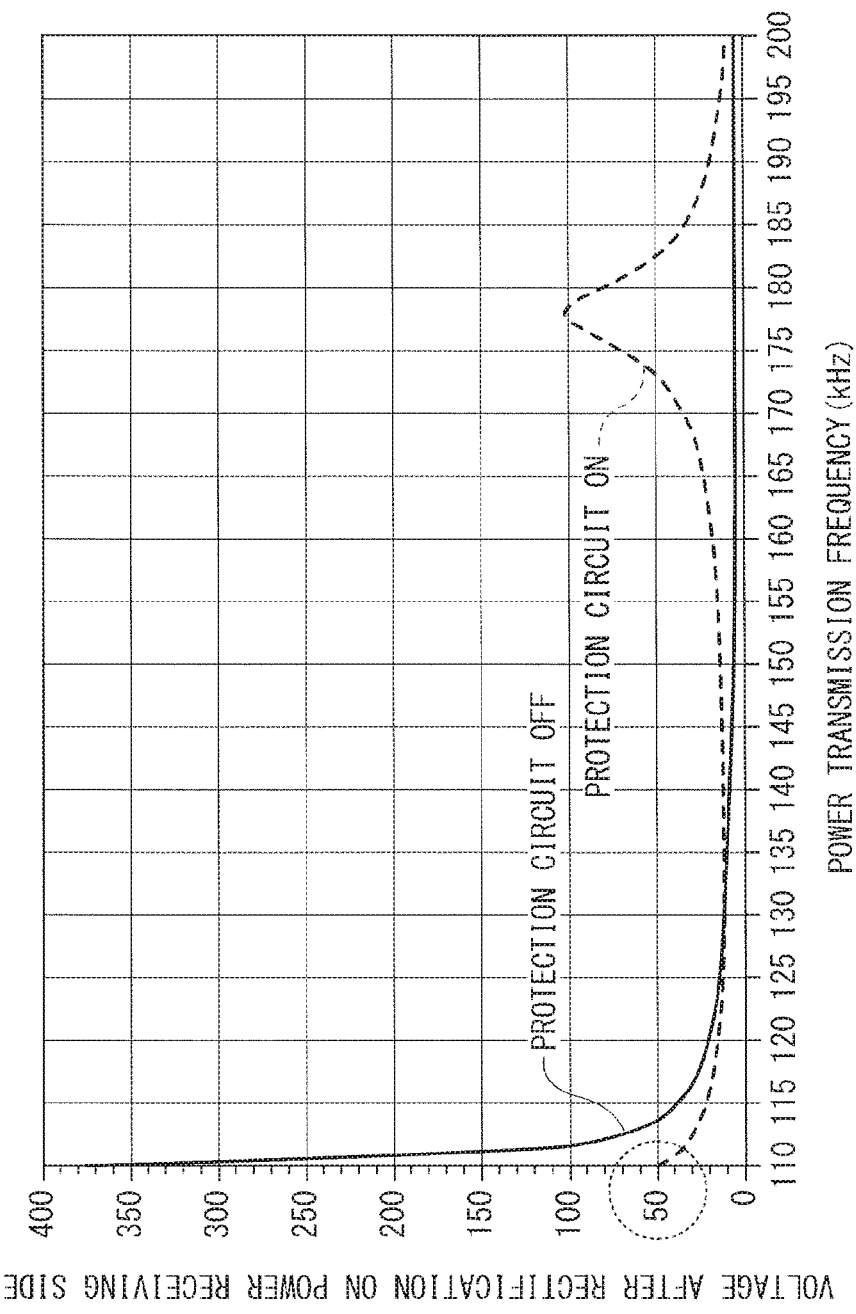

[ FIG. 9 ]
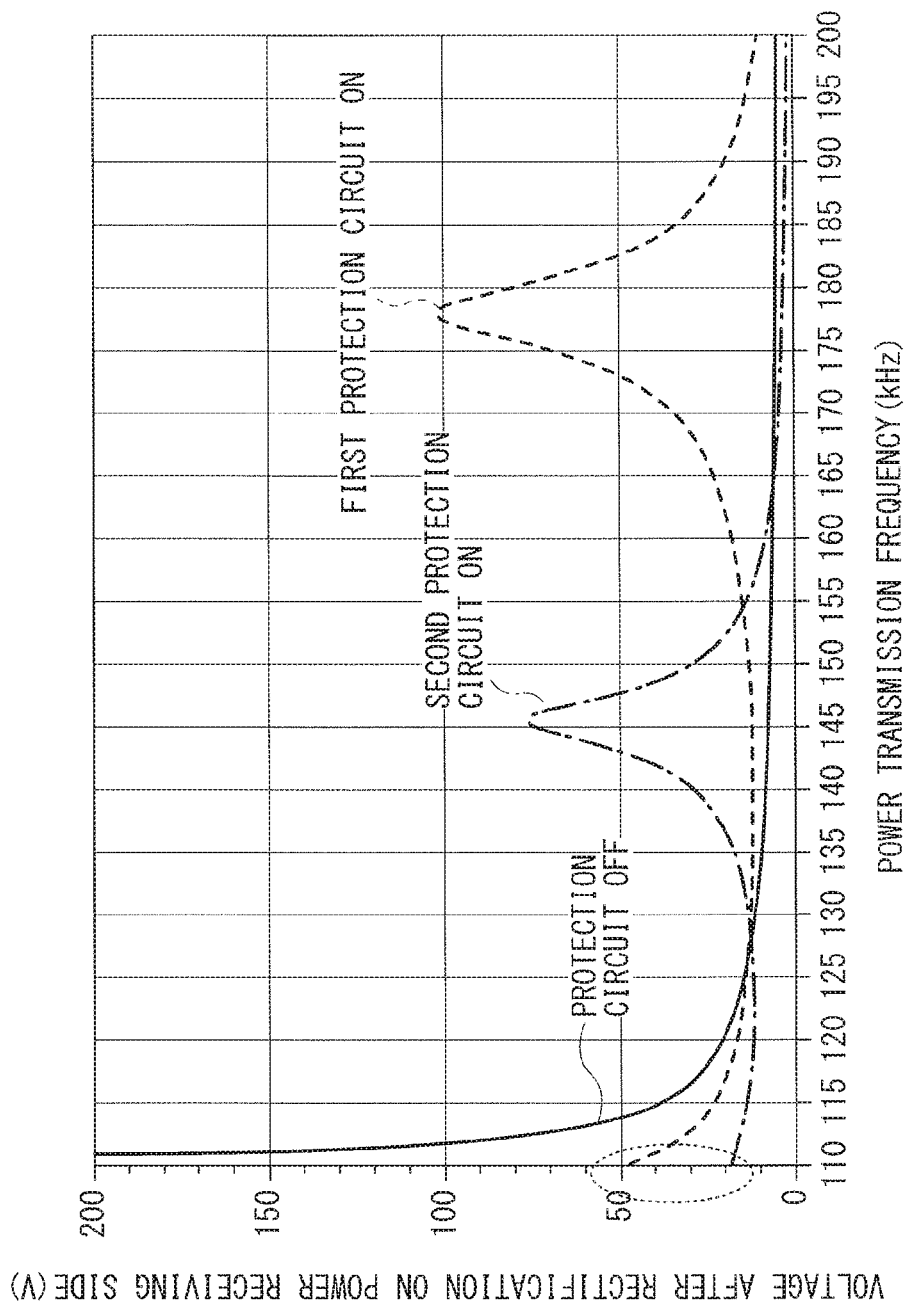

[FIG. 10]
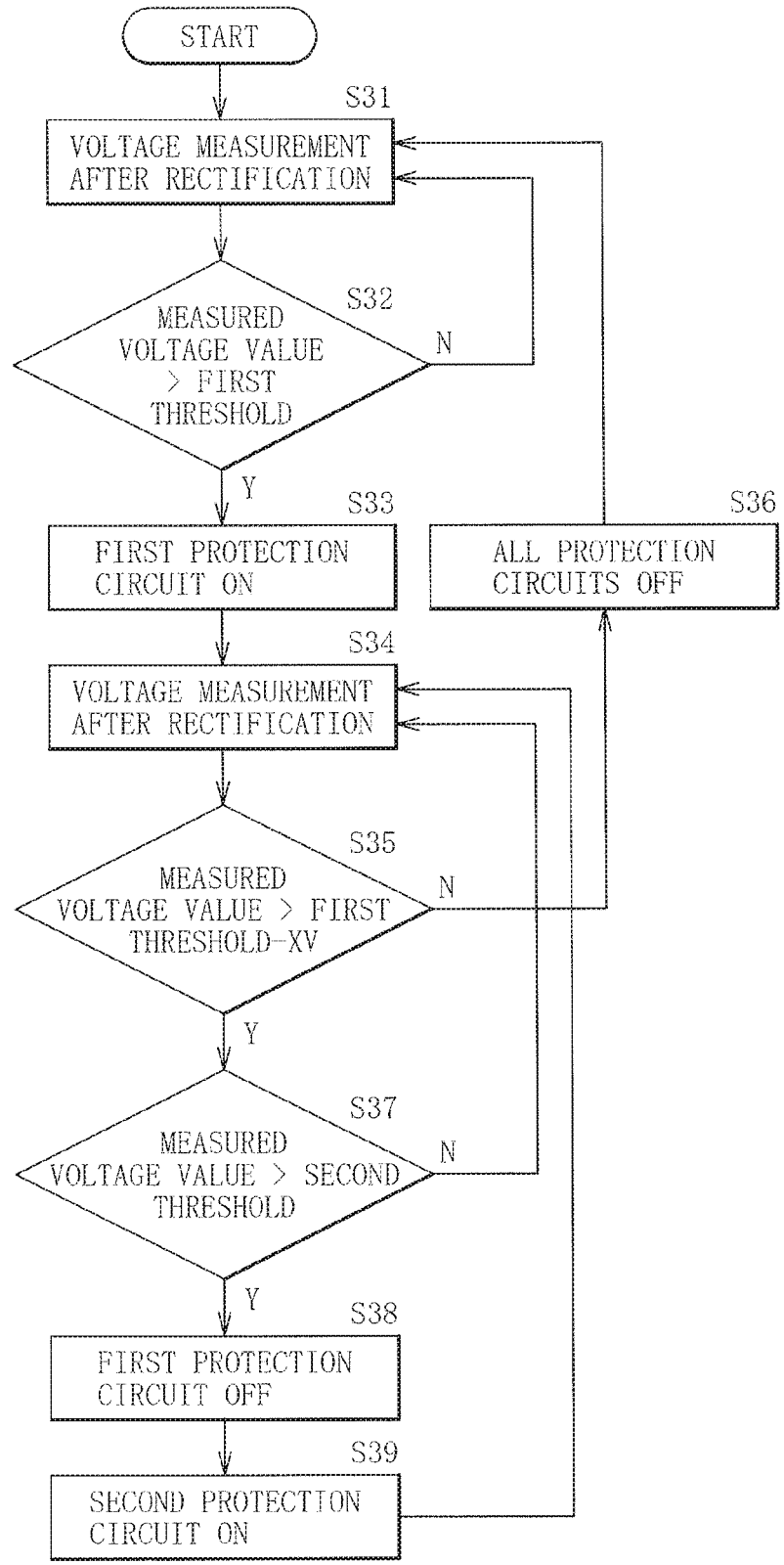

[ FIG. 11 ]
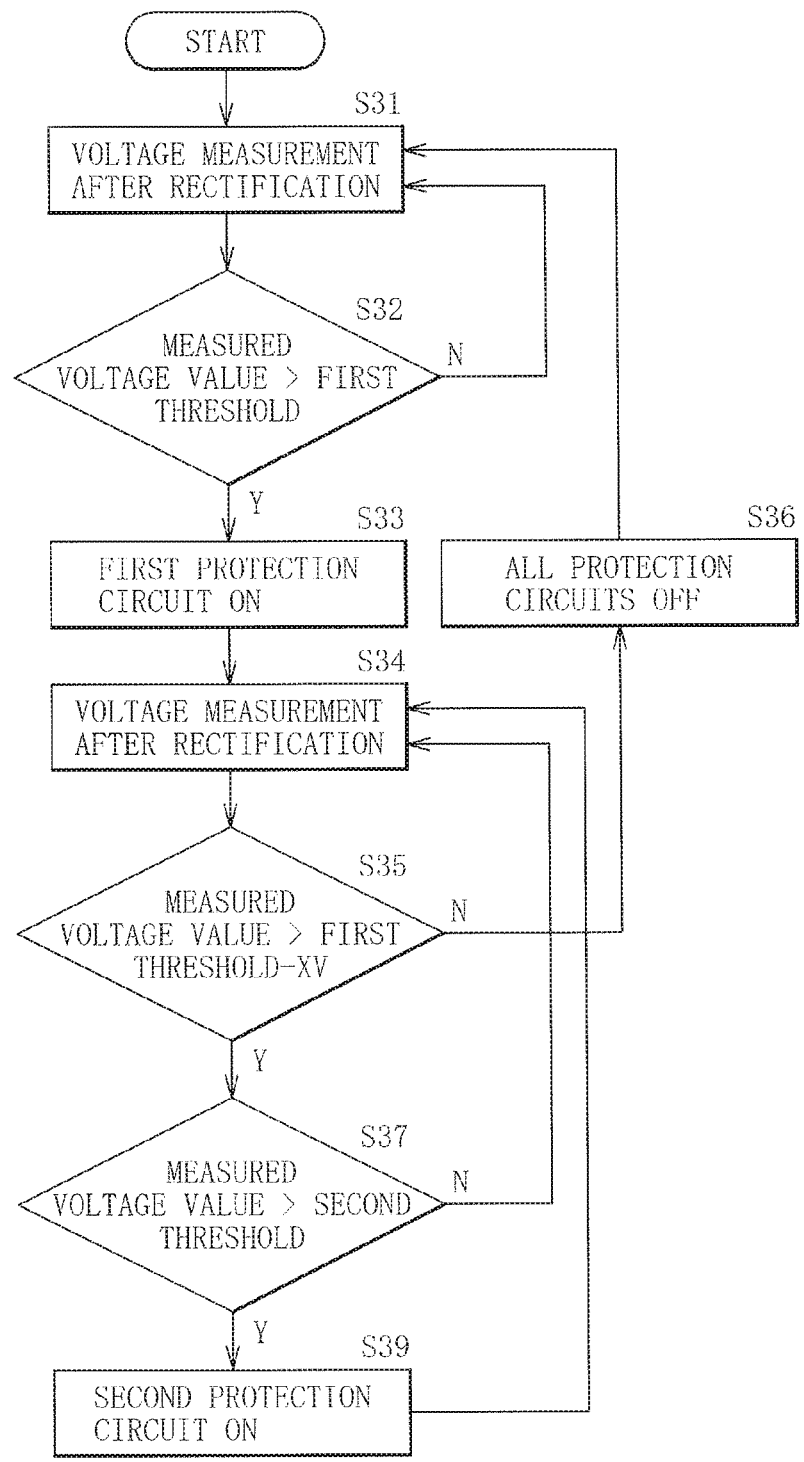

[ FIG. 12 ]
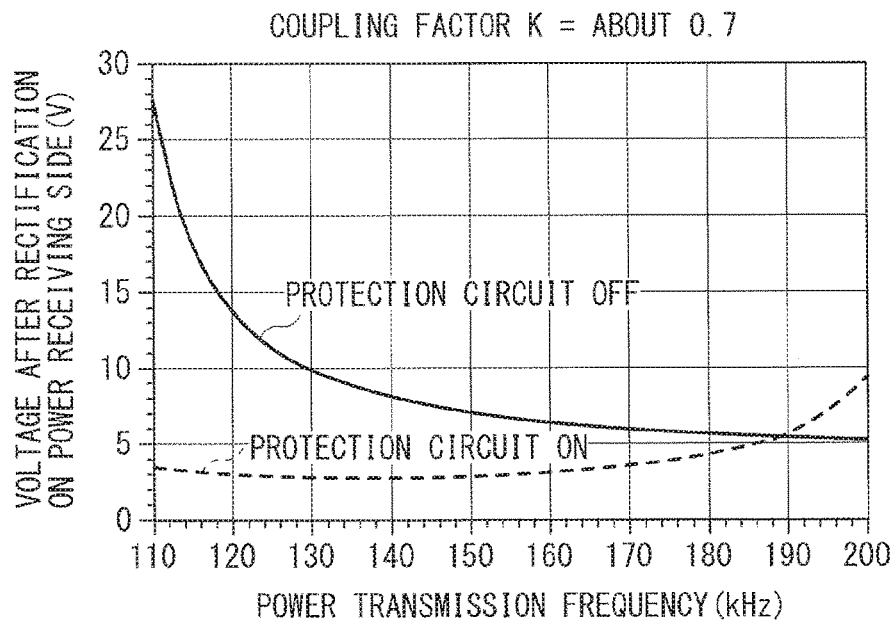
[ FIG. 13 ]
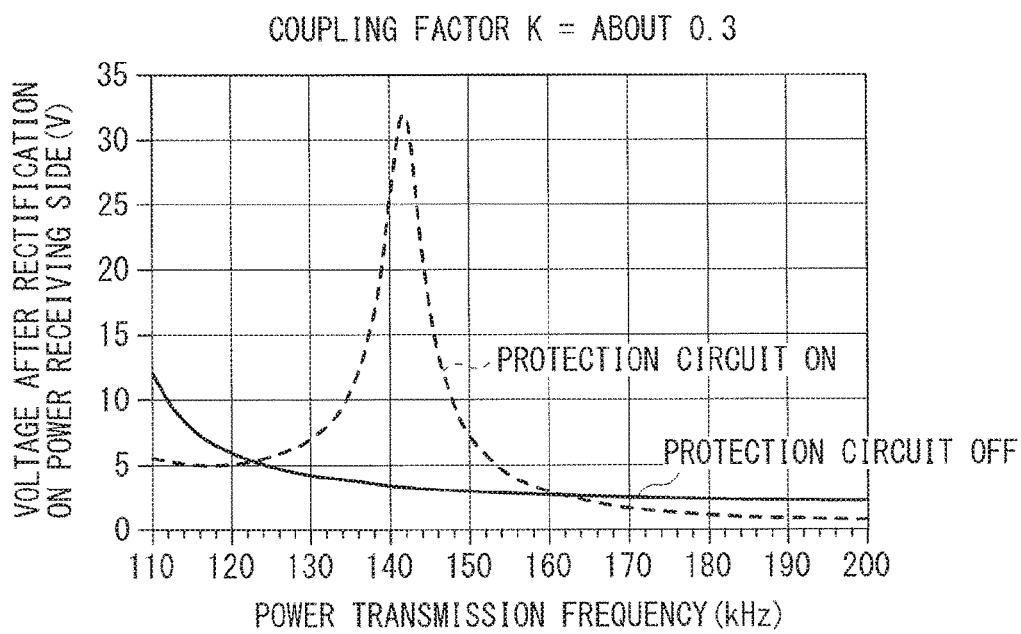

[ FIG. 14 ]
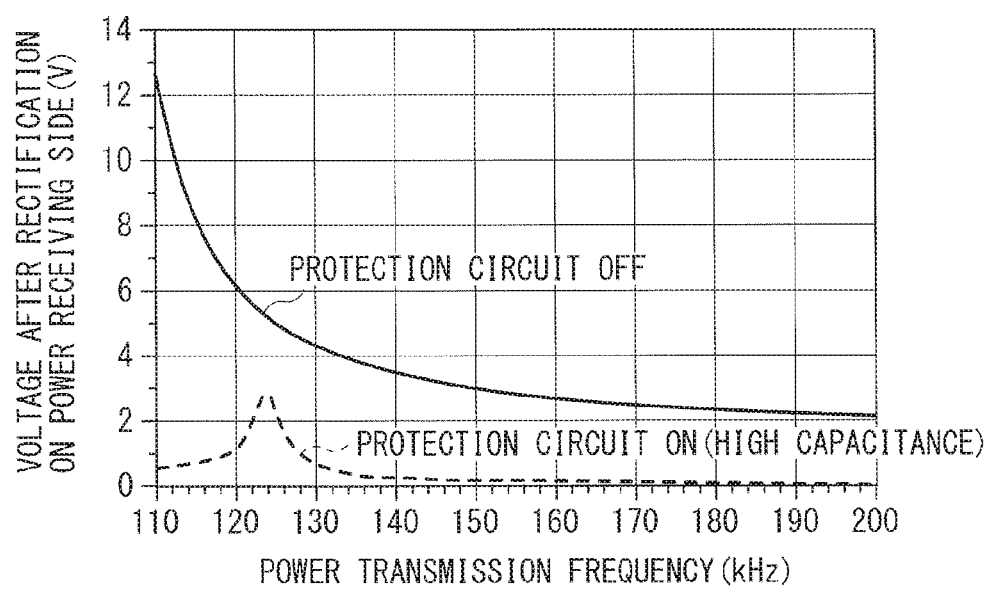
[ FIG. 15 ]
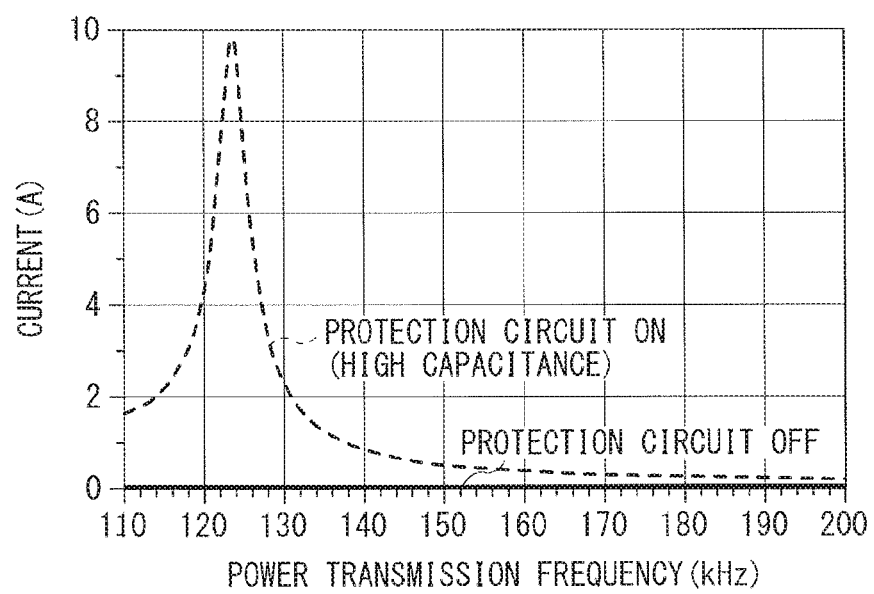

POWER RECEIVING UNIT, POWER RECEIVING CONTROL METHOD, WIRELESS POWER TRANSFER SYSTEM, AND ELECTRONIC APPARATUS

TECHNICAL FIELD

The present disclosure relates to a power receiving unit that receives power wirelessly from a power transfer unit (in a contactless manner), a power receiving control method used in such a power receiving unit, and a wireless power transfer system and an electronic apparatus that each use such a power receiving unit.

BACKGROUND ART

In recent years, a transfer system that performs wireless power transfer (also called contact-free or contactless power transfer) on CE devices (Consumer Electronics devices) such as mobile phones and portable music players has attracted attention. In such a transfer system, for example, an electronic apparatus (such as a mobile phone) having a power receiving unit may be charged by placing the electronic apparatus on a power transfer unit such as a power transfer tray. In other words, in such a transfer system, the power transfer is allowed to be performed without interconnecting the power transfer unit and the power receiving unit by a cable or the like.

Examples of methods of performing such wireless power transfer may include an electromagnetic induction method and a magnetic field resonance method (also called magnetic resonance method) using resonance phenomena. In these methods, power is transmitted with use of magnetic coupling between a coil of a power transfer unit and a power receiving coil of a power receiving unit. Among them, as compared with the electromagnetic induction method, advantageously, the magnetic field resonance method is allowed to transmit power even if the power transfer unit and the power receiving unit are away from each other, and transfer efficiency in the magnetic field resonance method does not particularly drop even if positioning between the power transfer unit and the power receiving unit is insufficient.

CITATION LIST

Patent Literature

[PTL 1] Japanese Unexamined Patent Application Publication (Published Japanese Translation of PCT Application) No. JP2013-537034

[PTL 2] Japanese Unexamined Patent Application Publication No. 2011-114985

[PTL 3] Japanese Unexamined Patent Application Publication No. 2008-206296

SUMMARY

Wireless power transfer is characterized in that a voltage arising on the power receiving side may vary significantly due to large variation in a coupling factor between a coil and a power receiving coil. In some cases, power transfer may be performed at frequency close to a resonance point, and thus a voltage of more than 100 V may be generated temporarily when a user moves the position drastically or takes any other similar action; however, it may be difficult in terms of cost and size to ensure that the power receiving side has a withstand voltage exceeding such a voltage. Therefore, an overvoltage protection circuit in the event of generation of the voltage exceeding a predetermined magnitude is a critical factor in the wireless power transfer, and various methods have been proposed.

The method used in the PTL 1 is a very typical method, and in this method, the overvoltage protection circuit has a capacitor, and a voltage is reduced in such a manner that frequency characteristics are varied by short-circuiting the capacitor of the overvoltage protection circuit when any voltage exceeding a predetermined magnitude is detected. However, such a method has an issue specific to the wireless power transfer. As mentioned above, in the wireless power transfer, a coupling factor between a coil and a power receiving coil may vary significantly; however, in spite of a state where power transfer is performed at the same power transmission frequency, the voltage may increase instead depending on a value of the coupling factor when the overvoltage protection circuit is operated.

As a method of avoiding this issue, a method of short-circuiting a power receiving coil end through a considerably high-capacitance capacitor with use of the overvoltage protection circuit is considered. Such a method is also stated in the PTL 2. In this method, however, although frequency characteristics of a voltage are stabilized when the overvoltage protection circuit is operated, a considerably large current may flow depending on a value of the power transmission frequency. In such a case, it is also likely that the current with a magnitude of several times through several dozen times as high as that during the normal operation will flow, which may pose issues such as an increase in the size of a clamp circuit itself configuring the overvoltage protection circuit, and excess of a withstand current of the power receiving coil.

Further, as another method, it is considered to separate a power receiving coil section and an IC (Integrated Circuit) circuit section within a power receiving unit in the overvoltage event. Such a method is also stated in the PTL 3. However, this method has also major disadvantages. In this method, a considerably large voltage is generated by opening a coil end. More specifically, a withstand voltage of a separation circuit itself involves a considerably large withstand voltage, and this is disadvantageous in terms of size and cost. Further, the separation circuit is also employed during the normal power receiving time, which may pose an issue that the efficiency will deteriorate due to an ON resistance of the separation circuit.

Accordingly, it is desirable to provide a power receiving unit, a power receiving control method, a wireless power transfer system, and an electronic apparatus that make it possible to control the overvoltage properly.

A power receiving unit according to an embodiment of the disclosure includes: a power receiving section that receives power transferred from a power transfer unit in a contactless manner; a protection circuit section that varies a receiving power voltage of the power received by the power receiving section; and a control section that controls an operational state of the protection circuit section to a plurality of statuses on the basis of a plurality of thresholds.

A power receiving control method according to an embodiment of the disclosure includes: receiving power transferred from a power transfer unit in a contactless manner; and controlling an operational state of a protection circuit section that varies a receiving power voltage of the received power to a plurality of statuses on the basis of a plurality of thresholds.

A wireless power transfer system according to an embodiment of the disclosure includes a power transfer unit and a power receiving unit, wherein the power receiving unit is constituted by the power receiving unit according to the above-described embodiment of the disclosure.

An electronic apparatus according to an embodiment of the disclosure includes a power receiving unit and a load connected to the power receiving unit, wherein the power receiving unit is constituted by the power receiving unit according to the above-described embodiment of the disclosure.

In the power receiving unit, the power receiving control method, the wireless power transfer system, and the electronic apparatus according to the respective embodiments of the disclosure, the operational state of the protection circuit section that varies the receiving power voltage is controlled to be set to the plurality of statuses on the basis of a plurality of thresholds.

According to the power receiving unit, the power receiving control method, the wireless power transfer system, and the electronic apparatus according to the respective embodiments of the disclosure, the operational state of the protection circuit section that varies the receiving power voltage is controlled to be set to the plurality of statuses on the basis of a plurality of thresholds, and thus it is possible to control the overvoltage properly.

It is to be noted that effects of the embodiments of the disclosure are not limited to this effect, and may include any of effects that will be described in the disclosure.

BRIEF DESCRIPTION OF DRAWINGS

FIG. 1 is a perspective view illustrating an example of a transfer system according to a first embodiment of the disclosure.

FIG. 2 is a block diagram illustrating an example of a circuit configuration of the transfer system illustrated in FIG. 1.

FIG. 3 is a circuit diagram illustrating a first configuration example of a protection circuit section in a power receiving unit according to the first embodiment.

FIG. 4 is a circuit diagram illustrating a second configuration example of the protection circuit section in the power receiving unit according to the first embodiment.

FIG. 5 is a flowchart illustrating an example of control of an operational state of the protection circuit section in the first embodiment.

FIG. 6 is a flowchart illustrating an example of control of an operational state of a protection circuit section in a second embodiment.

FIG. 7 is a circuit diagram illustrating a configuration example of a protection circuit section in a power receiving unit according to a third embodiment.

FIG. 8 is a characteristic diagram illustrating an example of relationship between a power transmission frequency and a rectified voltage in a case where a protection circuit section is constituted by a single overvoltage protection circuit.

FIG. 9 is a characteristic diagram illustrating an example of relationship between a power transmission frequency and a rectified voltage in a case where a protection circuit section is constituted by two overvoltage protection circuits.

FIG. 10 is a flowchart illustrating a first example of control of an operational state of a protection circuit section in the third embodiment of the disclosure.

FIG. 11 is a flowchart illustrating a second example of control of an operational state of the protection circuit section in the third embodiment of the disclosure.

FIG. 12 is a characteristic diagram illustrating an example of relationship between a power transmission frequency and a rectified voltage in a case where a coupling factor k is equal to 0.7 in an overvoltage protection circuit according to a first comparative example.

FIG. 13 is a characteristic diagram illustrating an example of relationship between a power transmission frequency and a rectified voltage in a case where the coupling factor k is equal to 0.3 in the overvoltage protection circuit according to the first comparative example.

FIG. 14 is a characteristic diagram illustrating an example of relationship between a power transmission frequency and a rectified voltage in a case where a high-capacitance capacitor is used in an overvoltage protection circuit as a second comparative example.

FIG. 15 is a characteristic diagram illustrating an example of relationship between a power transmission frequency and a current in a case where the high-capacitance capacitor is used in the overvoltage protection circuit as the second comparative example.

EMBODIMENTS FOR CARRYING OUT THE INVENTION

Hereinafter, some embodiments of the disclosure will be described in detail with reference to the drawings. It is to be noted that description will be given in the following order.
1. First embodiment (an example of controlling operation of a protection circuit section on the basis of an absolute value of a receiving power voltage)
   1.1 Configuration
   1.2 Operation (an example of operation of controlling a protection circuit section)
   1.3 Effects
2. Second embodiment (an example of controlling operation of a protection circuit section on the basis of a degree of variation in a receiving power voltage)
   2.1 Operation (an example of controlling operation of a protection circuit section)
3. Third embodiment (an example where a protection circuit section has two overvoltage protection circuits)
   3.1 Configuration (a configuration example of a protection circuit section)
   3.2 Operation (an example of operation of controlling a protection circuit section)
   3.3 Effects
4. Other embodiments 1. First Embodiment 1.1 Configuration (Overall Configuration of Transfer System 4)

FIG. 1 illustrates an overall configuration example of a transfer system 4 according to a first embodiment of the disclosure. FIG. 2 illustrates an example of a circuit configuration of the transfer system 4. It is to be noted that a power receiving unit, a power receiving control method, and an electronic apparatus according to the respective embodiments of the disclosure are embedded by the present embodiment, and therefore are described together.

The transfer system 4 is a system (a wireless power transfer system) that performs contactless power transmission (power supply, power transfer, or power transmission) with use of a magnetic field (with use of, for example, but not limited to, magnetic field resonance or electromagnetic induction; the same applies hereinafter). The transfer system 4 includes a power transfer unit 1 (a primary-side unit) and one or a plurality of electronic apparatuses (in this example, one electronic apparatus 2; a secondary-side unit) as a transfer target apparatus having a power receiving unit 3 (FIG. 2).

For example, as illustrated in FIG. 1, in the transfer system 4, by disposing the electronic apparatus 2 on (or placing in the vicinity of) a power transfer surface (a power transmission surface) S of the power transfer unit 1, power transmission is performed from the power transfer unit 1 to the electronic apparatus 2. Here, as an example, the power transfer unit 1 has a mat shape (a tray shape) in which an area of the power transfer surface S1 is larger than the electronic apparatus 2 or any other apparatus to be transferred with power.

A coil 106 (FIG. 2) described later is disposed on the power transfer surface S1 (on a side in contact with the power receiving unit 3 included in the electronic apparatus 2) of the power transfer unit 1, and a power receiving coil 201 (FIG. 2) described later is disposed on a power receiving surface (on a side in contact with the power transfer unit 1) of the electronic apparatus 2. The power transfer unit 1 transmits power to the electronic apparatus 2 with use of magnetic coupling through the coil 106 and the power receiving coil 201. At this time, the power receiving unit 3 of the electronic apparatus 2 may communicate with the power transfer unit 1 through, for example, load modulation, and instruct the power transfer unit 1 to increase or decrease the feed power. As a result, a user is allowed to charge the electronic apparatus 2 or any other apparatus without directly connecting an AC (alternating current) adapter or any other similar device with the electronic apparatus 2, which makes it possible to enhance usability of the user.

In the example of FIG. 1, the electronic apparatus 2 is a digital camera; however, the electronic apparatus 2 is not limited thereto. For example, various portable terminal devices such as a video camera, a smartphone, a mobile battery, a personal computer, a tablet, a phablet, an electronic book reader, an audio player, an audio recorder, a speaker, a headphone, a head-mounted display, an accessory, a game machine, a wearable appliance, a glasses-type device, a wrist-mounted device, and a medical instrument may be used. An area of the power transfer surface S1 of the power transfer unit 1 may be desirably larger than an area of the power receiving surface of the electronic apparatus 2. It is to be noted that this is not limitative, and for example, the area of the power transfer surface S1 may be equivalent to the area of the power receiving surface of the electronic apparatus 2, or may be smaller than the area of the power receiving surface of the electronic apparatus 2.

Moreover, the power transfer unit 1 may be configured to be embedded into other electronic apparatuses or electric appliances, or may be configured to be embedded into, for example, but not limited to, a wall or a floor. Moreover, the electronic apparatus 2 may be configured to have a function similar to that of the power transfer unit 1 in addition to the power receiving unit 3, and to supply power to the other power receiving units.

(Configuration of Power Transfer Unit 1)

As illustrated in FIG. 2, the power transfer unit 1 includes an AC/DC converter 102, a power transmission driver 103, a control section 104, a power transfer section 10 having a capacitor 105 and the coil 106, and a communication section 107.

The AC/DC converter 102 converts an AC power source 101 such as AC 100 V into DC low-voltage power, and supplies the DC low-voltage power to the power transmission driver 103. It is to be noted that using the AC power source 101 is an example, and for example, a DC power source may be used as an input power source. The power transfer section 10 is connected to the power transmission driver 103, and feed power of a predetermined power transmission frequency is supplied from the power transmission driver 103 to the coil 106.

The coil 106 and the capacitor 105 are electrically connected in series to each other. The power transfer section 10 has a function of using the coil 106 to radiate a magnetic field (magnetic flux) from the power transfer surface S1 toward the electronic apparatus 2. In the power transfer section 10, an LC resonance circuit is configured using the coil 106 and the capacitor 105. Further, the LC resonance circuit formed in the power transfer section 10 and an LC resonance circuit formed in a power receiving section 20 described later are magnetically coupled with each other (mutual induction).

The communication section 107 is intended to bi-directionally communicate with the power receiving unit 3. The communication by the communication section 107 may be performed, for example, in such a manner that a transmission signal is superimposed on the feed power supplied from the power transmission driver 103 to the coil 106. Specifically, information is modulated through amplitude shift keying (ASK), frequency shift keying (FSK), or any other modulation scheme with use of a frequency of the feed power supplied to the coil 106, as a carrier wave, and is thereafter transmitted. The transmission of the information from the power receiving unit 3 side to the communication section 107 is also performed by a similar method. Alternatively, for the transmission of the information from the power receiving unit 3 side to the communication section 107, the transmission with use of a subcarrier whose frequency is different from that of the feed power may be also permitted. For the method of bi-directionally transmitting information together with power in a contactless manner between adjacent coils, various methods are already used practically in, for example, but not limited to, communication between a contactless IC card and a reader, and any method may be applied in the example of the disclosure.

Moreover, the communication section 107 may communicate with a communication section 206 of the power receiving unit 3 described later with use of other wireless transmission paths different from the transfer system or a wired transmission path without being limited to the communication method in which the transmission signal is superimposed on the feed power to perform communication.

The communication section 107 may have a function of demodulating a transfer control signal that has been transmitted by the power receiving unit 3 of the electronic apparatus 2 through so-called load modulation while the power transfer unit 1 transfers power to the electronic apparatus 2. The transfer control signal may contain information necessary for the power transmission operation, such as an increase request or a decrease request of the feed power from the power receiving unit 3 to the power transfer unit 1.

The control section 104 controls the feed power supplied from the power transmission driver 103 to the coil 106. The control section 104 may control the power transmission operation of the power transfer unit 1 on the basis of the transfer control signal. At this time, the control section 104 may control the power transmission driver 103 to change the power transmission frequency.

(Configuration of Electronic Apparatus 2 Having Power Receiving Unit 3)

As illustrated in FIG. 2, the electronic apparatus 2 has the power receiving unit 3 and a load 204 that is connected to the power receiving unit 3. The power receiving unit 3 includes the power receiving section 20, a rectification section 203, a control section 205, a communication section 206, a memory section 207, a regulator 210, a voltage measurement section 213, and a protection circuit section 214. The power receiving section 20 has the power receiving coil 201 and a capacitor 202A.

The power receiving section 20 receives power transferred from the power transfer unit 1 in a contactless manner. In the power receiving section 20, the power receiving coil 201 and the capacitor 202A configure the LC resonance circuit. The power receiving coil 201 receives power from the coil 106 of the power transfer unit 1. For example, on the basis of an electromagnetic field generated by the coil 106 of the power transfer unit 1, the power receiving section 20 may generate an induced voltage according to change of the magnetic flux, in accordance with law of electromagnetic induction.

The power receiving section 20 is connected to the rectification section 203 via the protection circuit section 214. The rectification section 203 rectifies power of a predetermined frequency received by the power receiving coil 201 to obtain DC power. The DC power obtained by the rectification section 203 is supplied to the regulator 210.

The regulator 210 is a voltage converter that converts the power rectified by the rectification section 203 into stable power of a desired voltage. The DC power of the predetermined voltage obtained by the regulator 210 is supplied to the load 204. It is to be noted that a secondary battery may be charged instead of the load 204.

The communication section 206 is intended to bi-directionally communicate with the communication section 107 of the power transfer unit 1 side. To allow the communication section 206 to perform the communication, a series circuit of the power receiving coil 201 and the capacitor 202A is connected to the communication section 206, and the series circuit detects the signal superimposed on the power supplied from the power transfer unit 1 to receive the signal transmitted from the communication section 107. Moreover, the signal transmitted from the communication section 206 is supplied to the series circuit of the power receiving coil 201 and the capacitor 202A.

The communication section 206 may have a function of transmitting the transfer control signal that is supplied from the control section 205 to the power transfer unit 1 through so-called load modulation while the power transfer unit 1 transfers power to the electronic apparatus 2 (the power receiving unit 3). It is to be noted that, as described above, the transfer control signal may contain information necessary for the power transmission operation, such as the increase request or the decrease request of the feed power to the power transfer unit 1. In addition, the communication with the power transfer unit 1 by the communication section 206 is not limited to the load modulation, and various communication methods may be adopted similarly to the communication section 107 of the power transfer unit 1 described above. Further, the communication section 206 may have a function of receiving, from the power transfer unit 1, a signal including information that allows the transfer method to be identified.

The voltage measurement section 213 is connected to a transmission path between the rectification section 203 and the regulator 210, and allows for measurement of a received voltage of the power rectified by the rectification section 203.

The protection circuit section 214 is disposed at a transmission path between the power receiving section 20 and the rectification section 203. The protection circuit section 214 is an overvoltage protection circuit for preventing a receiving power voltage of the power received by the power receiving section 20 from exceeding a predetermined overvoltage protection setup voltage (OVP (Overvoltage Protection) voltage). The protection circuit section 214, an operational state of which is controlled by the control section 205, makes it possible to vary the receiving power voltage.

For example, as illustrated in a first configuration example in FIG. 3, the protection circuit section 214 is constituted by a capacitor 301 and a MOSFET 303. One end of the capacitor 301 is connected to a transmission path at a high-voltage side of the power receiving unit 3, and a second end is connected to a first terminal of the MOSFET 303. A second terminal of the MOSFET 303 is connected to a transmission path at a low-voltage side of the power receiving unit 3. A gate terminal of the MOSFET 303 is connected to the control section 205.

For example, as illustrated in a second configuration example in FIG. 4, the protection circuit section 214 may be configured using a resistor 301r instead of the capacitor 301 in the first configuration example in FIG. 3.

In the configuration examples illustrated in FIG. 3 and FIG. 4, as a normal operation of the overvoltage protection circuit, a measured voltage may be decreased by turning on the MOSFET 303 when the voltage exceeds a predetermined overvoltage protection setup voltage. As described later, however, the voltage may increase instead by setting the overvoltage protection circuit in ON state, and in such a case, the overvoltage protection circuit is controlled to be set to OFF state.

The control section 205 sets a target voltage of the power rectified by the rectification section 203, and outputs a transfer control signal instructing the power transfer unit 1 to perform the power transmission operation with the power according to the target voltage to the power transfer unit 1 through the communication section 206.

The control section 205 also controls the operational state of the protection circuit section 214 in a plurality of statuses on the basis of a plurality of thresholds. In the first embodiment, as described later, on the basis of a receiving power voltage measured after rectification by the rectification section 203, the operational state of the protection circuit section 214 is controlled in a first state where operation of the overvoltage protection circuit of the protection circuit section 214 is set to ON state and in a second state where operation of the overvoltage protection circuit is set to OFF state.

The memory section 207 stores various kinds of control information and any other information used in the control section 205.

1.2 Operation

Example of Operation of Controlling the Protection Circuit Section 214

Hereinafter, specific examples of operation of controlling the protection circuit section 214 will be described. Prior to description of control operation examples according to the present embodiment, issues with well-known methods of controlling an overvoltage protection circuit will be described as comparative examples. In each of the comparative examples, any configurations and operation other than parts relating to configuration and the control of the overvoltage protection circuit may be substantially similar to those of the transfer system 4 in the present embodiment. Here, the control method stated in the PTL 1 (Japanese Unexamined Patent Application Publication (Published Japanese Translation of PCT Application) No. JP2013-537034) will be described as a first comparative example. Further, the control method stated in the PTL 2 (Japanese Unexamined Patent Application Publication No. 2011-114985) will be described as a second comparative example.

For the well-known overvoltage protection circuit, operation of the overvoltage protection circuit is controlled on the basis of only a single threshold, that is, only a single overvoltage protection setup voltage. For example, as the first comparative example, in the control method stated in the PTL 1 (Japanese Unexamined Patent Application Publication (Published Japanese Translation of PCT Application) No. JP2013-537034), the overvoltage protection circuit has a capacitor, and a voltage is reduced in such a manner that frequency characteristics are varied by setting the overvoltage protection circuit in ON state, that is, by short-circuiting the capacitor of the overvoltage protection circuit when any voltage exceeding a predetermined level (overvoltage protection setup voltage) is detected. Such a method has an issue specific to wireless power transfer. In the wireless power transfer, a coupling factor between the coil 106 and the power receiving coil 201 may vary significantly; however, as illustrated in FIG. 12 and FIG. 13, in spite of a state where power transfer is performed at the same power transmission frequency, the voltage may increase instead depending on a value of a coupling factor k when the overvoltage protection circuit is operated.

FIG. 12 illustrates frequency characteristics of a receiving power voltage in a case where the coupling factor k is equal to 0.7 in the overvoltage protection circuit according to the first comparative example. FIG. 13 illustrates frequency characteristics of a receiving power voltage in a case where the coupling factor k is equal to 0.3 in the overvoltage protection circuit according to the first comparative example. In each of FIG. 12 and FIG. 13, a horizontal axis denotes the power transmission frequency, and a vertical axis denotes the receiving power voltage after rectification by the rectification section 203. Each of FIG. 12 and FIG. 13 illustrates the frequency characteristics of the receiving power voltage in cases where the overvoltage protection circuit is set to ON state and OFF state. Setting the overvoltage protection circuit in ON state, that is, short-circuiting the capacitor of the overvoltage protection circuit only means that the frequency characteristics of the voltage are changed. In the wireless power transfer, it is common that the coupling factor k may be varied in relation to movement of a user, and the voltage will be reduced normally when the overvoltage protection circuit is set to ON state in the vicinity of about 140 kHz in a state (the coupling factor k is equal to 0.7) as illustrated in FIG. 12, for example. However, for example, if a user moves a position of the power receiving unit 3 relative to the power transfer unit 1, or takes any other similar action while the overvoltage protection circuit is operated in ON state, the coupling factor k may be changed. For example, if the coupling factor k changes down to 0.3, the voltage surges instead in the vicinity of about 140 kHz due to the overvoltage protection circuit, which could destroy IC circuit portions of the power receiving unit 3. In the case of a typical DC-DC converter, it may be unnecessary to assume any charge change in the coupling factor k on the way; however, in the case of the wireless power transfer, it is not uncommon that the coupling factor k changes as a result of movement of the power receiving unit 3 by a user on any timing basis.

As a method of avoiding this issue, for example, as stated in the PTL 2 (Japanese Unexamined Patent Application Publication No. 2011-114985), a method of short-circuiting a power receiving coil end through a considerably high-capacitance capacitor with use of the overvoltage protection circuit is considered.

As the second comparative example, each of FIG. 14 and FIG. 15 illustrates the frequency characteristics in a case where the overvoltage protection circuit uses a high-capacitance capacitor. In FIG. 14, a horizontal axis denotes the power transmission frequency, and a vertical axis denotes the receiving power voltage after rectification by the rectification section 203. In FIG. 15, a horizontal axis denotes the power transmission frequency, and a vertical axis denotes the current of a clamp circuit acting as the overvoltage protection circuit. Each of FIG. 14 and FIG. 15 illustrates the frequency characteristics in cases where the overvoltage protection circuit is set to ON state and OFF state.

With an increase in a capacitance value of the capacitor in use for the overvoltage protection circuit, an impedance is reduced accordingly to exhibit characteristics close to short-circuiting. As observed from FIG. 14, the voltage is restrained over the full frequency range by setting the overvoltage protection circuit in the second comparative example in ON state, that is, by short-circuiting the high-capacitance capacitor. However, setting the overvoltage protection circuit in ON state results in an extremely low impedance, and thus a significantly large current may flow as illustrated in FIG. 15. As seen from FIG. 14 and FIG. 15, if the overvoltage protection circuit is set to ON state, the voltage decreases below a predetermined value over any frequency range; however, a location through which a significantly large current flow is present. It is also likely that the current with a magnitude of several times through several dozen times as high as that during the normal operation will flow, which may pose issues such as an increase in the size of a clamp circuit itself, and excess of a withstand current of the power receiving coil.

In the present embodiment, to avoid the issues as stated in the above comparative examples in a case where the overvoltage protection circuit is set to ON state, the control section 205 controls operation of the protection circuit section 214. More specifically, the control section 205 controls operation of the protection circuit section 214 to set it in a first state when the receiving power voltage exceeds a first threshold that is a predetermined protection setup voltage. Further, the control section 205 controls to switch operation of the protection circuit section 214 to a second state when the receiving power voltage increases above a second threshold while the protection circuit section 214 is operating in the first state. Here, in the present embodiment, the control leading to the first state corresponds to the control of setting operation of the overvoltage protection circuit of the protection circuit section 214 in ON state, and the control leading to the second state corresponds to the control of setting operation of the overvoltage protection circuit of the protection circuit section 214 in OFF state. Moreover, in the present embodiment, the control section 205 determines whether the receiving power voltage rises above the second threshold on the basis of an absolute value of the receiving power voltage.

FIG. 5 illustrates an example of control of an operational state of the protection circuit section 214 in the present embodiment. The control section 205 measures a receiving power voltage of the power after rectification with use of the voltage measurement section 213 (step S11). The control section 205 determines whether the measured voltage value exceeds the first threshold that is the predetermined protection setup voltage (step S12). If the measured voltage value does not exceed the first threshold (step S12; N), the process by the control section 205 returns to the process of the step S11. If the measured voltage value exceeds the first threshold (step S12; Y), the control section 205 sets operation of the protection circuit section 214 in the first state, that is, operation as the overvoltage protection circuit in ON state (step S13). The operation described thus far is substantially similar to that of a typical overvoltage protection circuit.

The control section 205 sets operation of the overvoltage protection circuit of the protection circuit section 214 in ON state, and thereafter measures a receiving power voltage of the power after rectification with use of the voltage measurement section 213 (step S14). Subsequently, the control section 205 determines whether the measured voltage value has dropped fully with the help of the overvoltage protection circuit. First, the control section 205 determines whether the measured voltage value has dropped by a hysteresis (XV) relative to the first threshold that is the predetermined protection setup voltage (step S15). When the control section 205 is allowed to determine that the measured voltage value has dropped by the hysteresis (XV) (step S15; N), the control section 205 sets operation of the overvoltage protection circuit of the protection circuit section 214 in the second state, that is, OFF state (step S16), and thereafter the process by the control section 205 returns to the process of the step S11.

Here, in the wireless power transfer, it is necessary to take account of the possibility that the coupling factor k will be changed due to, for example, but not limited to, movement of the power receiving unit 3 relative to the power transfer unit 1 as described above at a timing when operation of the overvoltage protection circuit is set to ON state, which may result in an increase in the voltage instead. Therefore, when the measured voltage value does not drop by the hysteresis (XV) although operation of the overvoltage protection circuit is set to ON state (step S15; Y), the control section 205 further determines whether the measured voltage value has exceeded the second threshold (step S17).

When the measured voltage value has not exceeded the second threshold (step S17; N), the process by the control section 205 returns to the process of the step S14. When the measured voltage value has risen above the second threshold (step S17; Y), the control section 205 sets operation of the overvoltage protection circuit of the protection circuit section 214 in the second state, that is, OFF state (step S18), and thereafter the process by the control section 205 returns to the process of the step S14.

Here, the second threshold is set to a value higher than the first threshold that may be, for example, the predetermined protection setup voltage. For example, the second threshold may be set to a value between the first threshold and an absolute maximum rating of an IC configuring a circuit within the power receiving unit 3. Typically, when a voltage reaches the first threshold, the voltage will drop by operation of the overvoltage protection circuit, and thus it is unlikely that the voltage will rise to or above the first threshold. If the voltage reaches the second threshold, events that a coupling factor changes immediately after operation of the overvoltage protection circuit, or a voltage reaches a protection setup voltage instantaneously due to unexpected noise, and any other similar incidents may be assumed. In such a case, it is quite likely that a voltage will drop by setting operation of the overvoltage protection circuit in OFF state. The operation of controlling the protection circuit section 214 according to the present embodiment has an effect close to that obtained by selecting the characteristics that allow a voltage to be reduced between the characteristics in cases where the overvoltage protection circuit is set to ON state and OFF state as illustrated in FIG. 12 and FIG. 13.

1.3 Effects

As describe above, according to the present embodiment, the operational state of the protection circuit section 214 to vary the receiving power voltage is controlled to a plurality of statuses on the basis of a plurality of thresholds, and therefore it is possible to control the overvoltage properly.

For the control employing a currently-available method, there has been a risk that the overvoltage occurs in the event of a change in the coupling factor k due to, for example, but not limited to, movement of the power receiving unit 3 relative to the power transfer unit 1; however, the safety is improved by means of control of operation of the protection circuit section 214 according to the present embodiment.

It is to be noted that the effects described in the present specification are merely examples without limitation, and other effects may be obtainable. The same applies to the following other embodiments and modifications.

2. Second Embodiment

Example of Controlling Operation of a Protection Circuit Section on the Basis of a Degree of Variation in a Receiving Power Voltage In the present embodiment, the configurations and operation other than parts relating to partial control operation of the protection circuit section 214 as described hereinafter may be substantially similar to those in the above-described first embodiment (FIG. 1 to FIG. 5). In the second embodiment, an overall basic configuration of the transfer system 4 including the protection circuit section 214 may be substantially similar to that as illustrated in FIG. 1 and FIG. 2.

2.1 Operation

Example of Controlling Operation of the Protection Circuit Section 214

In the above-described first embodiment, the control section 205 makes a judgment on the basis of an absolute value of a receiving power voltage, in determining whether the receiving power voltage has risen above the second threshold (step S17 in FIG. 5). In the present embodiment, however, the control section 205 makes a judgment on a rise in the voltage on the basis of a degree of variation in the receiving power voltage (a slope of rise in the voltage).

FIG. 6 illustrates an example of control of the operational state of the protection circuit section 214 in the present embodiment. Processes of steps S21 to S26 and S28 in FIG. 6 are substantially similar to those of steps S11 to S16 and S18 in the above-described first embodiment (FIG. 5). A process of a step S27 is different from that in the above-described first embodiment.

In the present embodiment, when a measured voltage value does not drop by the hysteresis (XV) although operation of the overvoltage protection circuit is set to ON state (step S25; Y), the control section 205 further determines whether a degree of variation in the receiving power voltage (a slope of rise in the voltage) has exceeded a third threshold (step S27). When such a voltage has not exceeded the third threshold (step S27; N), the process by the control section 205 returns to the process of the step S24. When the voltage has risen above the third threshold (step S27; Y), the control section 205 sets operation of the overvoltage protection circuit of the protection circuit section 214 in the second state, that is, OFF state (step S28), and thereafter the process by the control section 205 returns to a process of the step S24.

In making a judgment in the step S27, the control section 205 measures a receiving power voltage of the rectified power with use of the voltage measurement section 213 at predetermined time intervals. Subsequently, the control section 205 calculates a degree of variation in the receiving power voltage (a slope of rise in the voltage) from a difference between a present measured voltage value and a previous measured voltage value. If the degree of rise in the voltage exceeds the third threshold (step S27; Y), the control section 205 sets operation of the overvoltage protection circuit in OFF state (step S28). With this control, it is likely that the control section 205 will allow for a judgment on switchover of operation of the overvoltage protection circuit earlier in comparison with a method of switching operation of the overvoltage protection circuit on the basis of an absolute value of the voltage.

3. Third Embodiment

Example where the Protection Circuit Section 214 has Two Overvoltage Protection Circuits In the present embodiment, the configurations and operation other than parts relating to configuration and control operation of the protection circuit section 214 may be substantially similar to those in the above-described first or second embodiment. In the present embodiment, an overall basic configuration of the transfer system 4 including the protection circuit section 214 may be substantially similar to that as illustrated in FIG. 1 and FIG. 2.

3.1 Configuration

Configuration Example of the Protection Circuit Section 214

In the above-described first and second embodiments, a case where the protection circuit section 214 is constituted by a single overvoltage protection circuit is taken as an example as illustrated in FIG. 3 or FIG. 4; however, the protection circuit section 214 may be constituted by a plurality of overvoltage protection circuits. Further, the control section 205 may perform control to set operation of at least one overvoltage protection circuit among the plurality of overvoltage protection circuits in ON state on the basis of a measured receiving power voltage.

FIG. 7 illustrates a configuration example of the protection circuit section 214 in the present embodiment. In the configuration example in FIG. 7, the protection circuit section 214 is constituted by a first overvoltage protection circuit 214A and a second overvoltage protection circuit 214B. The first overvoltage protection circuit 214A is constituted by a capacitor 301A and a MOSFET 303A. One end of the capacitor 301A is connected to a transmission path at a high-voltage side of the power receiving unit 3, and the other end is connected to a first terminal of the MOSFET 303A. A second terminal of the MOSFET 303A is connected to a transmission path at a low-voltage side of the power receiving unit 3. A gate terminal of the MOSFET 303A is connected to the control section 205.

The second overvoltage protection circuit 214B is constituted by a capacitor 301B and a MOSFET 303B. One end of the capacitor 301B is connected to a transmission path at a high-voltage side of the power receiving unit 3, and the other is connected to a first terminal of the MOSFET 303B. A second terminal of the MOSFET 303B is connected to a transmission path at a low-voltage side of the power receiving unit 3. A gate terminal of the MOSFET 303B is connected to the control section 205.

In the configuration example illustrated in FIG. 7, it is possible to set the first overvoltage protection circuit 214A in ON state by turning on the MOSFET 303A. Similarly, it is possible to set the second overvoltage protection circuit 214B in ON state by turning on the MOSFET 303B.

The first overvoltage protection circuit 214A and the second overvoltage protection circuit 214B may be different from each other in a circuit constant. For example, a capacitance of the capacitor 301A and a capacitance of the capacitor 301B may be different from each other. As a result, for example, as illustrated in FIG. 9, frequency characteristics in a case where the first overvoltage protection circuit 214A is set to ON state and frequency characteristics in a case where the second overvoltage protection circuit 214B is set to ON state may be different from each other. It is to be noted that, in FIG. 9, a horizontal axis denotes the power transmission frequency, and a vertical axis denotes the receiving power voltage after rectification by the rectification section 203. FIG. 9 illustrates the frequency characteristics in a case where the first overvoltage protection circuit 214A is set to ON state, in a case where the second overvoltage protection circuit 214B is set to ON state, and in a case where both of the first overvoltage protection circuit 214A and the second overvoltage protection circuit 214B are set to OFF state.

3.2 Operation

Example of Operation of Controlling the Protection Circuit Section 214

The control section 205 controls operation of the protection circuit section 214 to a first state when the receiving power voltage exceeds the first threshold that is the predetermined protection setup voltage. The control section 205 further controls to switch operation of the protection circuit section 214 to the second state when the receiving power voltage rises above a second threshold while the protection circuit section 214 is operating in the first state. Here, in the present embodiment, the control leading to the first state may correspond to, for example, the control to set operation of the first overvoltage protection circuit 214A in ON state, as well as to set operation of the second overvoltage protection circuit 214B in OFF state. The control leading to the second state may correspond to, for example, the control to set operation of the first overvoltage protection circuit 214A in ON state or OFF state, as well as to set operation of the second overvoltage protection circuit 214B in ON state.

FIG. 10 illustrates a first example of control of the operational state of the protection circuit section 214 in the present embodiment. FIG. 11 illustrates a second example of control of the operational state of the protection circuit section 214 in the present embodiment. In FIG. 10 and FIG. 11, steps of performing substantially the same processes are denoted with the same step numerals. It is to be noted that, in the processes in FIG. 10 and FIG. 11, both of the first overvoltage protection circuit 214A and the second overvoltage protection circuit 214B are set to OFF state in initial status.

The control section 205 measures a receiving power voltage of the power after rectification with use of the voltage measurement section 213 (step S31). The control section 205 determines whether a measured voltage value exceeds the first threshold that is the predetermined protection setup voltage (step S32). If the measured voltage value does not exceed the first threshold (step S32; N), the process by the control section 205 returns to a process of the step S31. If the measured voltage value exceeds the first threshold (step S32; Y), the control section 205 sets operation of the protection circuit section 214 in the first state, that is, operation of the first overvoltage protection circuit 214A in ON state (step S33).

The control section 205 sets operation of the first overvoltage protection circuit 214A in the protection circuit section 214 in ON state, and thereafter measures a receiving power voltage of the power after rectification with use of the voltage measurement section 213 (step S34). Subsequently, the control section 205 determines whether the measured voltage value has dropped fully with the help of the first overvoltage protection circuit 214A. First, the control section 205 determines whether the measured voltage value has dropped by a hysteresis (XV) relative to the first threshold that is the predetermined protection setup voltage (step S35). When the control section 205 is allowed to determine that the measured voltage value has dropped by the hysteresis (XV) (step S35; N), the control section 205 sets operation of the first overvoltage protection circuit 214A of the protection circuit section 214 in OFF state (step S36), and thereafter the process by the control section 205 returns to the process of the step S31. It is to be noted that at this stage, the second overvoltage protection circuit 214B has not yet been set to ON state, and thus here both of the first overvoltage protection circuit 214A and the second overvoltage protection circuit 214B are set to OFF state.

Here, in the wireless power transfer, it is necessary to take account of the possibility that the coupling factor k will be changed due to, for example, but not limited to, movement of the power receiving unit 3 relative to the power transfer unit 1 as described above at a timing when operation of the overvoltage protection circuit is set to ON state, which may result in an increase in the voltage instead. Therefore, when the measured voltage value does not drop by the hysteresis (XV) although operation of the overvoltage protection circuit is set to ON state (step S35; Y), the control section 205 further determines whether the measured voltage value has exceeded the second threshold (step S37).

When the measured voltage value has not exceeded the second threshold (step S37; N), the process by the control section 205 returns to the process of the step S34. When the measured voltage value has risen above the second threshold (step S37; Y), the control section 205 sets operation of the protection circuit section 214 in the second state, and thereafter the process by the control section 205 returns to the process of the step S34.

Here, in the first example in FIG. 10, as the second state, the control section 205 sets operation of the first overvoltage protection circuit 214A in OFF state (step S38), and sets operation of the second overvoltage protection circuit 214B in ON state (step S39). In the second example in FIG. 11, as the second state, the control section 205 sets operation of the first overvoltage protection circuit 214A in ON state instead of OFF state, and further sets operation of the second overvoltage protection circuit 214B in ON state (step S39).

3.3 Effects

According to the present embodiment, the protection circuit section 214 has the plurality of overvoltage protection circuits, and thus it is possible to control the overvoltage more properly as compared with a case where the control is performed using only a single overvoltage protection circuit.

If the overvoltage protection circuit is constituted by only a single system, it is unlikely that proper control of the overvoltage will be attainable. FIG. 8 illustrates an example of frequency characteristics in a case where the protection circuit section 214 is constituted by a single overvoltage protection circuit. In FIG. 8, a horizontal axis denotes the power transmission frequency, and a vertical axis denotes the receiving power voltage after rectification by the rectification section 203. FIG. 8 illustrates the frequency characteristics of the receiving power voltage in cases where the overvoltage protection circuit is set to ON state and OFF state. For example, in the example in FIG. 8, a voltage value may be only allowed to be reduced down to 50 V at the lowest frequency domain. Therefore, for example, if a withstand voltage of an IC configuring a circuit of the power receiving unit 3 is 50 V or less, there will be a risk that the IC could be destroyed with absolute certainty irrespective of a method of controlling the operational state of the protection circuit section 214.

Instead, in the present embodiment, the protection circuit section 214 has the plurality of overvoltage protection circuits, and thus it is possible to increase the number of statuses of different frequency characteristics as illustrated in FIG. 9. As a result, a range of controlling the frequency characteristics will extend. In an example in FIG. 9, it is possible to reduce a voltage value down from 50 V to 20 V at the lowest frequency domain by controlling operation of the second overvoltage protection circuit 214B to be set to ON state. The use of the plurality of overvoltage protection circuits allows the safety to be further improved. Moreover, it is likely that this will allow a burden on the IC to be reduced in terms of the withstand voltage.

It is to be noted that, in the above descriptions, as a specific example, a case where the protection circuit section 214 has two overvoltage protection circuits is taken as an example; however, a configuration having three or more overvoltage protection circuits may be also possible.

4. Other Embodiments

The technology of the present disclosure is not limited to the above-described embodiments, and various modifications may be made.

For example, the technology may include the following configurations.

(1)

A power receiving unit including:

a power receiving section that receives power transferred from a power transfer unit in a contactless manner;

a protection circuit section that varies a receiving power voltage of the power received by the power receiving section; and a control section that controls an operational state of the protection circuit section to a plurality of statuses on the basis of a plurality of thresholds.

(2)

The power receiving unit according to (1), wherein the control section controls operation of the protection circuit section to a first state when the receiving power voltage exceeds a first threshold that is a predetermined protection setup voltage, and controls to switch operation of the protection circuit section to a second state when the receiving power voltage rises above a second threshold while the protection circuit section is operating in the first state.

(3)

The power receiving unit according to (2), herein the protection circuit section is an overvoltage protection circuit that prevents the receiving power voltage from exceeding the predetermined protection setup voltage, control leading to the first state corresponds to control of setting operation of the overvoltage protection circuit in ON state, and control leading to the second state corresponds to control of setting operation of the overvoltage protection circuit in OFF state.

(4)

The power receiving unit according to (2) or (3), wherein the control section determines whether the receiving power voltage rises above the second threshold on the basis of an absolute value of the receiving power voltage.

(5)

The power receiving unit according to (2) or (3), wherein the control section determines whether the receiving power voltage rises above the second threshold on the basis of a degree of variation in the receiving power voltage.

(6)

The power receiving unit according to (1) or (2), wherein the protection circuit section has a plurality of overvoltage protection circuits that prevent the receiving power voltage from exceeding a predetermined protection setup voltage, and the control section sets operation of at least one overvoltage protection circuit among the overvoltage protection circuits in ON state.

(7)

The power receiving unit according to (2), wherein the protection circuit section has a first overvoltage protection circuit and a second overvoltage protection circuit to prevent the receiving power voltage from exceeding the predetermined protection setup voltage, the control leading to the first state corresponds to control of setting operation of the first overvoltage protection circuit in ON state and operation of the second overvoltage protection circuit in OFF state, and the control leading to the second state corresponds to control of setting operation of the first overvoltage protection circuit in one of ON state and OFF state, and operation of the second overvoltage protection circuit in ON state.

(8)

The power receiving unit according to any one of (1) to (7), further including a rectification section that rectifies power received by the power receiving unit, wherein the control section controls an operational state of the protection circuit section on the basis of a receiving power voltage measured after rectification by the rectification section.

(9)

A power receiving control method, including:

receiving power transferred from a power transfer unit in a contactless manner, and controlling an operational state of a protection circuit section that varies a receiving power voltage of the received power to a plurality of statuses on the basis of a plurality of thresholds.

(10)

A wireless power transfer system provided with a power transfer unit and a power receiving unit, the power receiving unit including:

a power receiving section that receives power wirelessly transferred from the power transfer unit;

a protection circuit section that varies a receiving power voltage of the power received by the power receiving section; and a control section that controls an operational state of the protection circuit section to a plurality of statuses on the basis of a plurality of thresholds.

(11)

An electronic apparatus provided with a power receiving unit and a load connected to the power receiving unit, the power receiving unit including:

a power receiving section that receives power transferred from a power transfer unit in a contactless manner:

a protection circuit section that varies a receiving power voltage of the power received by the power receiving section; and a control section that controls an operational state of the protection circuit section to a plurality of statuses on the basis of a plurality of thresholds.

This application claims the priority on the basis of Japanese Patent Application No. 2014-15587 filed on Jan. 30, 2014 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power receiving apparatus comprising:

power receiving circuitry configured to receive power that is fed from a power feeding unit in a non-contact manner;

protection circuitry configured to vary a power receiving voltage of the power received by the power receiving circuitry; and a controller that controls an operational state of the protection circuitry to be put in a plurality of states respectively based on a plurality of thresholds, wherein the controller controls operation of the protection circuitry to be put in a first state in a case that the power receiving voltage exceeds a first threshold that is a predetermined protection setup voltage, and controls the switch operation of the protection circuitry to a second state in a case that the power receiving voltage exceeds a second threshold while the protection circuitry is operating in the first state, the protection circuitry includes a first overvoltage protection circuit and a second overvoltage protection circuit that are configured to prevent the power receiving voltage from exceeding the predetermined protection setup voltage, the control leading to the first state comprises putting operation of the first overvoltage protection circuit in an ON state and operation of the second overvoltage protection circuit in an OFF state, and the control leading to the second state comprises putting operation of the first overvoltage protection circuit in one of an ON state or an OFF state, and operation of the second overvoltage protection circuit in an ON state.

2. The power receiving apparatus according to claim 1, wherein the controller determines whether the power receiving voltage exceeds the second threshold, based on an absolute value of the power receiving voltage.

3. The power receiving apparatus according to claim 1, wherein the controller-determines whether the power receiving voltage exceeds the second threshold, based on a degree of variation in the power receiving voltage.

4. The power receiving apparatus according to claim 1, further comprising:
rectification circuitry that rectifies a power received by the power receiving apparatus, wherein
the controller controls an operational state of the protection circuitry based on a power receiving voltage measured after rectification by the rectification circuitry.

5. The power receiving apparatus of claim 1, wherein the second threshold is greater than the first threshold.

6. A power receiving control method, comprising:
receiving, by power receiving circuitry, power that is fed from a power feeding unit in a non-contact manner;
varying, by a protection circuitry, a power receiving voltage of the power received by the power receiving circuitry; and
controlling, by a controller, an operational state of the protection circuitry to be put in a plurality of states respectively based on a plurality of thresholds,
wherein the controller controls operation of the protection circuitry to be put in a first state in a case that the power receiving voltage exceeds a first threshold that is a predetermined protection setup voltage, and controls the switch operation of the protection circuitry to a second state in a case that the power receiving voltage exceeds a second threshold while the protection circuitry is operating in the first state,
the protection circuitry includes a first overvoltage protection circuit and a second overvoltage protection circuit that are configured to prevent the power receiving voltage from exceeding the predetermined protection setup voltage,
the control leading to the first state comprises putting operation of the first overvoltage protection circuit in an ON state and operation of the second overvoltage protection circuit in an OFF state, and
the control leading to the second state comprises putting operation of the first overvoltage protection circuit in one of an ON state or an OFF state, and operation of the second overvoltage protection circuit in an ON state.

7. A non-contact feed system provided with a power feeding unit and a power receiving unit, the power receiving unit comprising:
power receiving circuitry configured to receive power that is fed from the power feeding unit in a non-contact manner;
protection circuitry configured to vary a power receiving voltage of the power received by the power receiving circuitry; and
a controller that controls an operational state of the protection circuitry to be put in a plurality of states respectively based on a plurality of thresholds,
wherein the controller controls operation of the protection circuitry to be put in a first state in a case that the power receiving voltage exceeds a first threshold that is predetermined protection setup voltage, and controls the switch operation of the protection circuitry to a second state in a case that the power receiving voltage exceeds a second threshold while the protection circuitry is operating in the first state,
the protection circuitry includes a first overvoltage protection circuit and a second overvoltage protection circuit that are configured to prevent the power receiving voltage from exceeding the predetermined protection setup voltage,
the control leading to the first state comprises putting operation of the first overvoltage protection circuit in an ON state and operation of the second overvoltage protection circuit in an OFF state, and
the control leading to the second state comprises putting operation of the first overvoltage protection circuit in one of an ON state or an OFF state, and operation of the second overvoltage protection circuit in an ON state.

8. The non-contact feed system of claim 7, wherein the second threshold is greater than the first threshold.

9. An electronic apparatus including a power receiving unit configured to be connected to a load, the power receiving unit comprising:
power receiving circuitry configured to receive power that is fed from a power feeding unit in a non-contact manner;
protection circuitry configured to vary a power receiving voltage of the power received by the power receiving circuitry; and
a controller that controls an operational state of the protection circuitry to be put in a plurality of states respectively based on a plurality of thresholds,
wherein the controller controls operation of the protection circuitry to be put in a first state in a case that the power receiving voltage exceeds a first threshold that is predetermined protection setup voltage, and controls the switch operation of the protection circuitry to a second state in a case that the power receiving voltage exceeds a second threshold while the protection circuitry is operating in the first state,
the protection circuitry includes a first overvoltage protection circuit and a second overvoltage protection circuit that are configured to prevent the power receiving voltage from exceeding the predetermined protection setup voltage,
the control leading to the first state comprises putting operation of the first overvoltage protection circuit in an ON state and operation of the second overvoltage protection circuit in an OFF state, and
the control leading to the second state comprises putting operation of the first overvoltage protection circuit in one of an ON state or an OFF state, and operation of the second overvoltage protection circuit in an ON state.

10. The electronic apparatus of claim 9, wherein the second threshold is greater than the first threshold.

* * * * *